COIN OPERATED UTILITY

Filed March 24, 1964 16 Sheets-Sheet 1

INVENTOR.
John V. Gastowich,
BY
Paul & Paul
ATTORNEYS

March 22, 1966 J. V. GASTOWICH 3,241,646

COIN OPERATED UTILITY

Filed March 24, 1964 16 Sheets-Sheet 2

INVENTOR.
John V. Gastowich,
BY
Paul & Paul
ATTORNEYS.

INVENTOR.
John V. Gastowich,
BY
Paul & Paul
ATTORNEYS.

INVENTOR.
John V. Gastowich,
BY
Paul & Paul
ATTORNEYS.

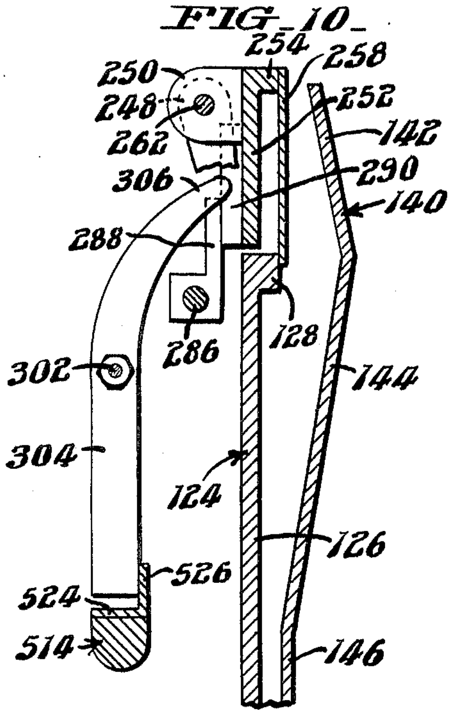
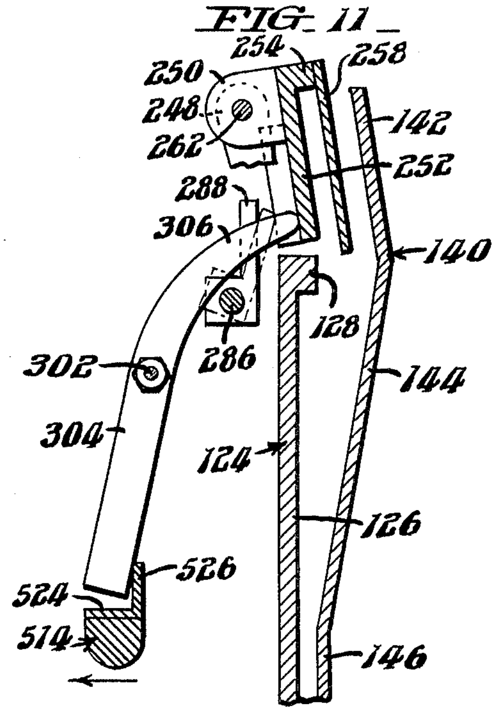
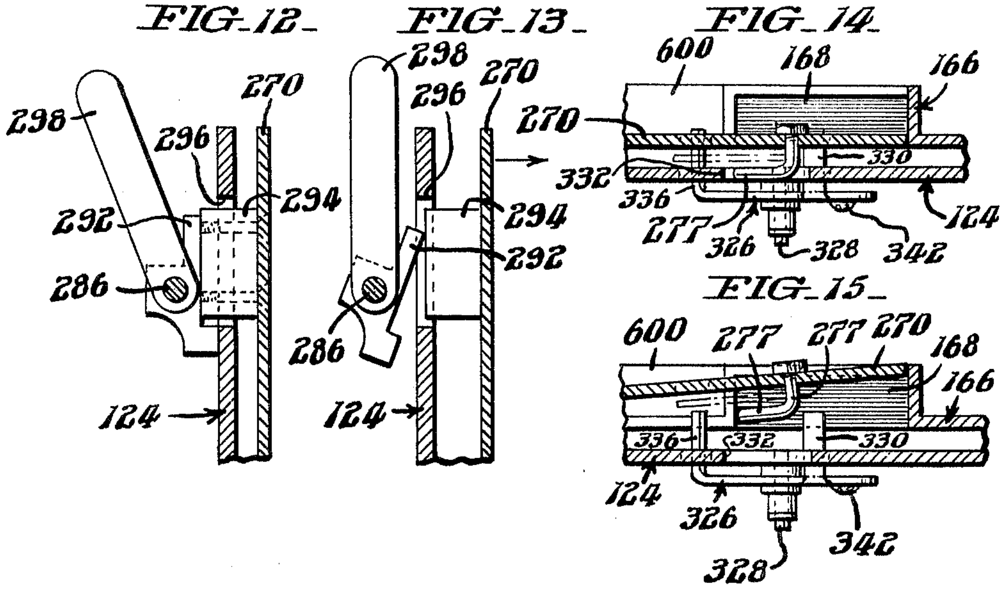
FIG. 12, FIG. 13, FIG. 14, FIG. 15
INVENTOR.
John V. Gastowich,
BY
Paul & Paul
ATTORNEYS.

March 22, 1966 J. V. GASTOWICH 3,241,646

COIN OPERATED UTILITY

Filed March 24, 1964 16 Sheets-Sheet 6

INVENTOR.
John V. Gastowich,
BY Paul & Paul
ATTORNEYS.

March 22, 1966 J. V. GASTOWICH 3,241,646

COIN OPERATED UTILITY

Filed March 24, 1964 16 Sheets-Sheet 7

INVENTOR.
John V. Gastowich,
BY
Paul & Paul
ATTORNEYS.

March 22, 1966 J. V. GASTOWICH 3,241,646

COIN OPERATED UTILITY

Filed March 24, 1964 16 Sheets-Sheet 8

INVENTOR.
John V. Gastowich,
BY Paul & Paul
ATTORNEYS.

INVENTOR.
John V. Gastowich,
BY
Paul & Paul
ATTORNEYS.

INVENTOR.
John V. Gastowich,
BY
Paul & Paul
ATTORNEYS.

INVENTOR.
John V. Gastowich,
BY
Paul & Paul
ATTORNEYS.

INVENTOR.
John V. Gastowich,
BY
Paul & Paul
ATTORNEYS.

March 22, 1966 J. V. GASTOWICH 3,241,646

COIN OPERATED UTILITY

Filed March 24, 1964 16 Sheets-Sheet 13

INVENTOR.
John V. Gastowich,
BY
Paul & Paul
ATTORNEYS.

March 22, 1966 J. V. GASTOWICH 3,241,646

COIN OPERATED UTILITY

Filed March 24, 1964 16 Sheets-Sheet 14

INVENTOR.
John V. Gastowich,
BY Paul & Paul
ATTORNEYS.

March 22, 1966 J. V. GASTOWICH 3,241,646

COIN OPERATED UTILITY

Filed March 24, 1964 16 Sheets-Sheet 15

INVENTOR.
John V. Gastowich,
BY
Paul & Paul
ATTORNEYS.

March 22, 1966 J. V. GASTOWICH 3,241,646

COIN OPERATED UTILITY

Filed March 24, 1964 16 Sheets-Sheet 16

INVENTOR.
John V. Gastowich,
BY
Paul & Paul
ATTORNEYS.

United States Patent Office 3,241,646

Patented Mar. 22, 1966

3,241,646

COIN OPERATED UTILITY

John V. Gastowich, Lodi, N.J., assignor to The Horn & Hardart Company, New York, N.Y., a corporation of New York Filed Mar. 24, 1964, Ser. No. 354,213
12 Claims. (Cl. 194—10)

This invention relates generally to coin operated utilities and particularly to an improved utility and coin operated control mechanism therefor.

In restaurants using automatic apparatus for serving articles of food to customers upon the dropping of the proper coins or tokens into a slot, i.e., in automats, it is conventional to control all of the food compartments of a battery thereof by one electromechanical system. This, however, has not proved to be entirely satisfactory because such a system inherently is extremely complicated. Due to its complicated nature, the system breaks down too frequently, and when a breakdown occurs, the whole battery of food compartments must be removed from service until repairs are effected. Accordingly, an important object of this invention is to provide a battery of utilities and a battery of coin operated control mechanisms respectively for said battery of utilities, each of said control mechanisms being in the form of a self-contained unit which operates independently of the others, and which may be removed and replaced by another unit without affecting operation of the others.

Another object is to provide such mechanisms which may be arranged to operate upon insertion of any one combination of coins selected from several predetermined combinations thereof.

Another object is to provide such mechanisms which may be arranged to operate only upon insertion of a predetermined number of coins of the same denomination.

Another object is to provide such mechanisms which accept the proper coins in any order.

Another object is to provide such mechanisms capable of rejecting slugs.

Other objects of the invention will become apparent when the following description is read with reference to the accompanying drawings, in which:

FIG. 10 is a section on line X—X in FIG. 3;

FIG. 11 is similar to FIG. 10 but shows the condition of the several parts upon operation of the control mechanism;

FIG. 12 is a section on line XII—XII in FIG. 3;

FIG. 13 is similar to FIG. 12 but shows the condition of the several parts upon actuation of a manually controlled lever;

FIG. 14 is a section on line XIV—XIV in FIG. 3, showing an arrested slug;

FIG. 15 is similar to FIG. 14 but shows the slug being released;

FIG. 32 is a section on line XXXII—XXXII in FIG. 31;

Figures 1, 2, 5, 6:
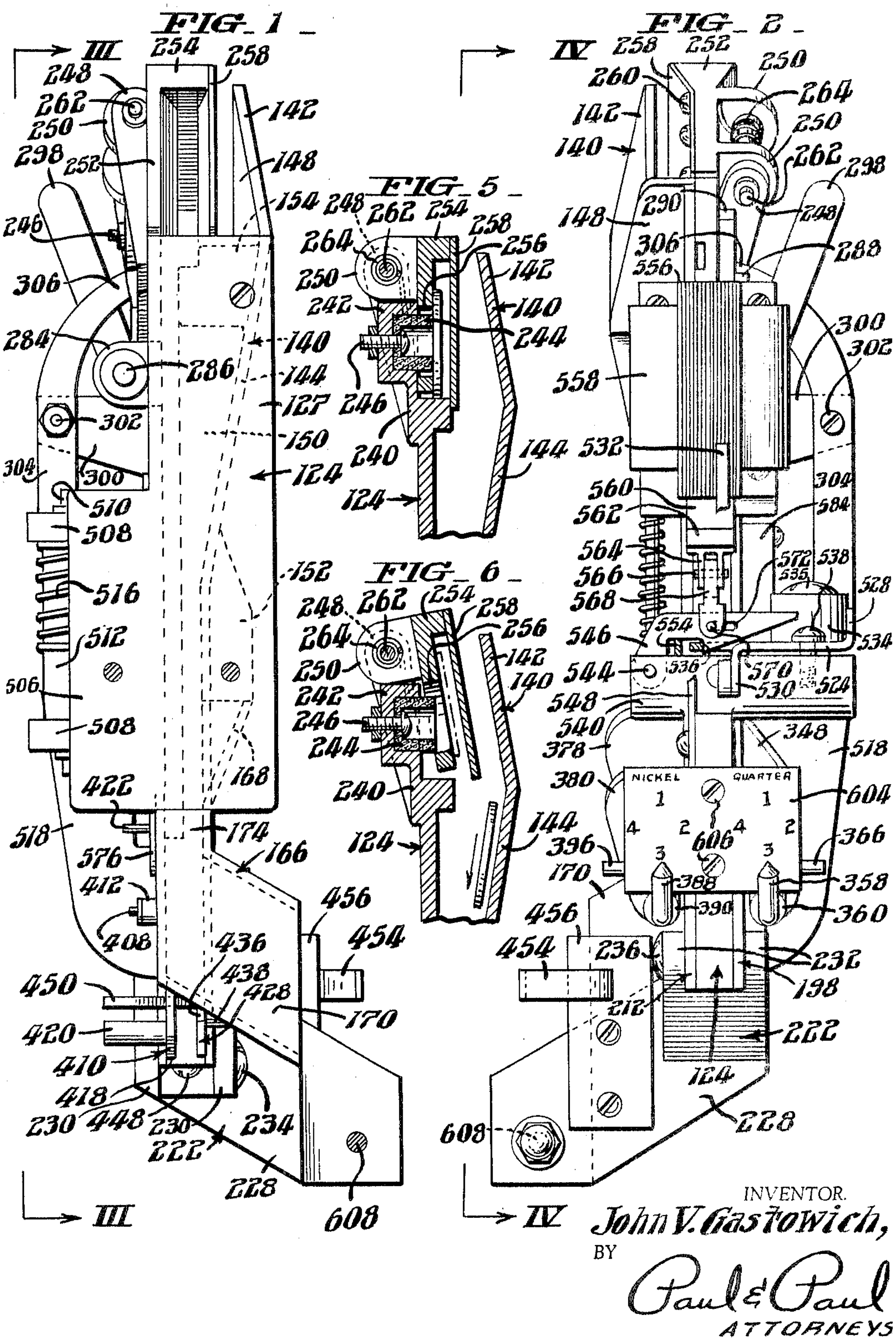
FIG. 1 is a front elevation of a coin operated control mechanism constructed in accordance with the invention.
FIG. 2 is a rear elevation of the control mechanism.
FIG. 5 is a section on line V—V in FIG. 3 showing an arrested slug.
FIG. 6 is similar to FIG. 5 but shows the slug being released.

The following description is directed to the specific embodiment shown in the drawings, and is not addressed to the scope of the invention which may be practiced in a variety of forms.

The present invention may be embodied in apparatus for dispensing articles of foods in automats. Referring particularly to FIGS. 31 to 35, the food cabinet of the exemplary apparatus comprises a rigid frame including upright laterally spaced walls bridged by horizontally extending walls to conjointly form a stack of compartments for dispensing food. The compartment, designated 10, is provided with opopsite side walls 12 and 14, a bottom wall 15 and a top wall 16. The top wall is provided with a flange depending therefrom at the front of the cabinet and leaving thereunder an access opening for the customer. The top wall is also provided with a flange depending therefrom at the rear of the cabinet and leaving thereunder an access opening for the attendant. Over the access opening for the customer is a door 20. At each end of the door is a rearwardly extending flange mounting a pair of spacer elements 22 which extend through an arcuate slot 24 formed in the associated side wall of the compartment. Affixed to each of said door flanges by means of the spacer elements 22 is a plate 26 pivoted to the associated side wall of the compartment by means of a pivot 28. The pivot 28 is carried by a bracket plate 30 secured by screws 32 to a spacer bar 34 in turn secured by screws 36 to the associated side wall of the compartment. To the upper rear corner of each plate 26 is secured a weight 37.

Depending from the top wall 16 of the compartment and extending thereacross intermediate the front and rear of the compartment is a plate 38 which mounts a pivot 40 for a latch lever 42. One terminal portion of the latch lever, designated 44, extends through a slot 46 formed in the side wall 14. The plate 38 also mounts a pivot 48 for a latch lever 50. One terminal portion of the latch lever, designated 52, extends through a slot 54 formed in the side wall 12. The levers 42 and 50 are provided respectively with tail plates 56 and 58, which plates are disposed with plate 56 overlying plate 58. The weights 37 bias the door 20 toward open position, but the terminal portions 44 and 52 of the latch levers 42 and 50 stay the door against the influence of the weights.

Secured to the side wall 14 of the cabinet is a casting provided with a base 60 secured by screws 62 to the side wall. Formed integral with the base 60 are a pair of laterally spaced ears 64 which mount a pivot 66 for a trip lever 68. One end of the trip lever, designated 70, extends through a slot 72 formed in the base 60 and through a registering opening in the side wall of the compartment. A lateral extension 76 of the end portion 70 of the trip lever underlies the terminal portion 44 of the latch lever 42.

Over the access opening for the attendant is a door 78 hinged, as at 80, to the associated depending flange of the top wall 16. The door is provided with a handle 82. Each end of the door is provided with a pivot 84 for a lever, generally designated 86. Affixed to the pivot is a lever part in the form of a round bar 88 provided with a hollow tubular end portion 90 which receives a rod 92 provided with a head 94. Wrapped about the rod 92 is a spring 96. The rod 92 extends through a sleeve 98 fixed in the end of the tubular end portion 90. Affixed to the rod 92 is a flat bar 100 in which is formed an elongated slot 102 which receives a pin 104 extending from the plate 26. Pivotally connected to the lever 86, as at 106, is a link 108 which is pivoted, as at 110, to a link 112. The link 112 is pivoted, as at 114, to a bracket 116 secured by a screw 118 to the plate 30 and by a screw 120 to the rear wall of the cabinet. The link 112 carries a cam 122 for a purpose to appear.

When the customer inserts the proper coins in the control mechanism associated with the compartment 10, to be described hereinafter, the trip lever is actuated. Whereupon, the end 70 and the lateral extension 76 thereof are raised, raising end 44 of the latch lever 42 and depressing the plate 56 of the latch lever 42. The plate 56 depresses the plate 58 of the latch lever 50, raising the end 52 of the latch lever 50. Thus the weights 37 are free to turn plates 26 and door 20 clockwise about pivots 28 to open position, i.e., from the position of FIG. 32 to the position of FIG. 34. The spacer elements 22 move freely in the slots 24.

The customer removes the food from the compartment. Subsequently, the attendant manually raises the door 78, as a consequence of which the levers 86 are pulled rearwardly. As the levers 86 move rearwardly they rock on the pivots 84 and swing the customer's door 20 counterclockwise about pivots 28 to closed position, i.e., from the position of FIG. 34 to the position of FIG. 35. After the door 20 reaches its closed position, the trip lever 68 is released, in a manner to appear, whereupon the end 70 and its lateral extension 76 are relowered, which results in the ends 44 and 52 of the latch levers 42 and 50 being relowered to door latching position, i.e., behind plates 26.

The attendant reloads the compartment and closes the door 78. Thereupon the levers 86 are pushed forwardly. Lost motion of the pins 104 in the slots 102 takes place, in consequence of which the door 20 remains closed.

Figure 23:
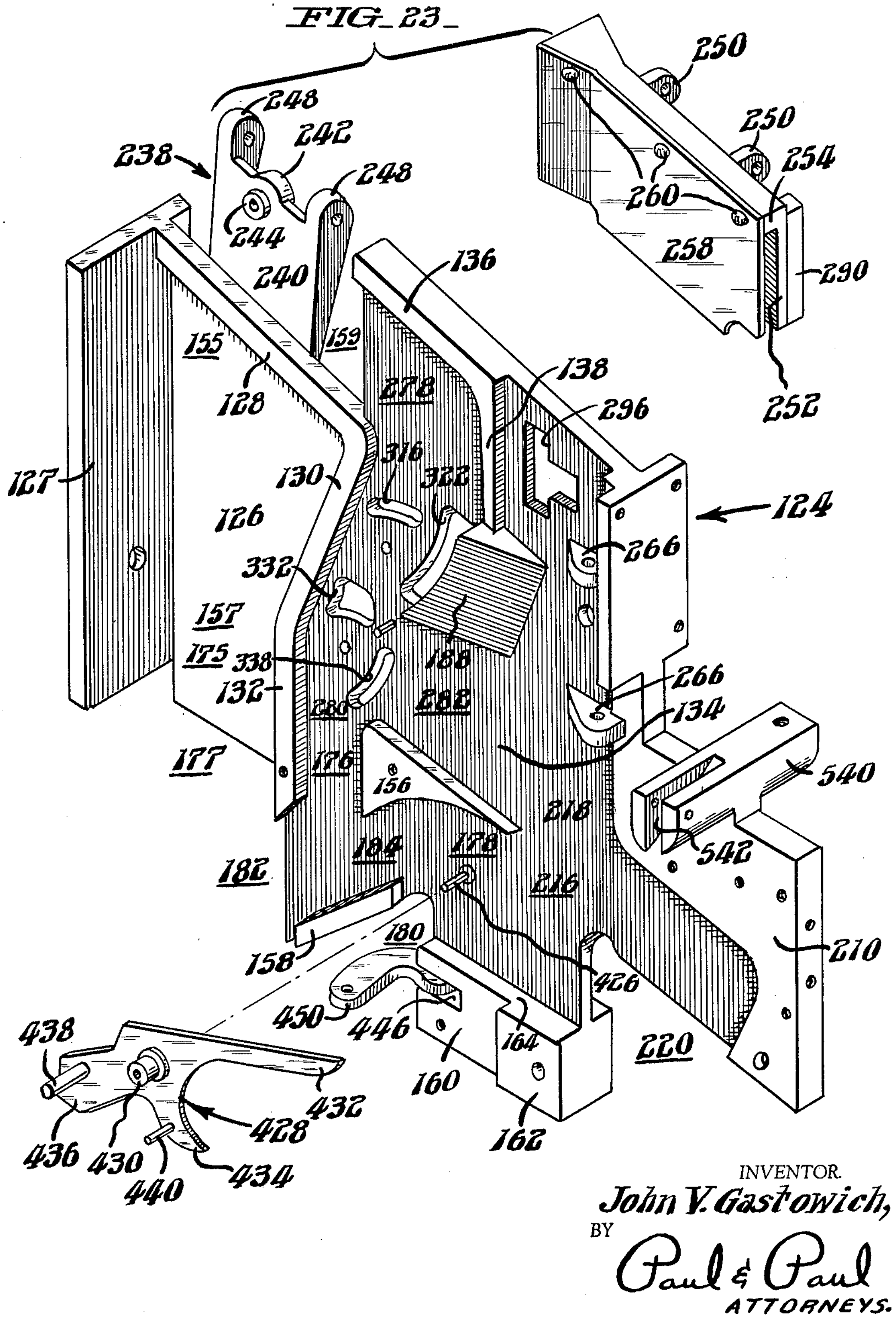
FIG. 23 is another exploded perspective view of the main casting of the frame of the control mechanism and of some related parts.

Now referring particularly to FIGS. 1 to 30, associated with each of the compartments 10 is a control mechanism which is responsive to insertion of proper coins for actuating the trip lever 68, and which is then automatically reset when the attendant opens the door 78. Referring particularly to FIG. 23, the frame of the control mechanism includes a main casting provided with a surface area 126 bounded by a flange 127 and by a raised rib having a part 128 extending rearwardly and downwardly from the flange 127, a part 130 extending forwardly and downwardly from the part 128 and a part 132 extending downwardly from the part 130. The main casting is also provided with a surface area 134 bounded by a raised rib including a part 136 sloping rearwardly and downwardly and a part 138 extending downwardly from the part 136.

Figure 28:
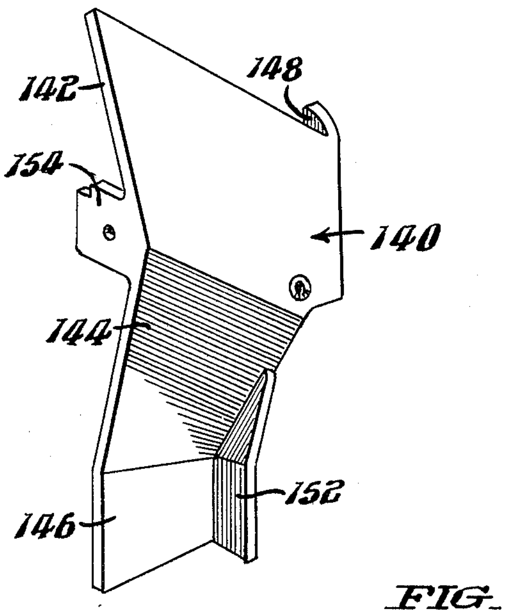
Figure 29:
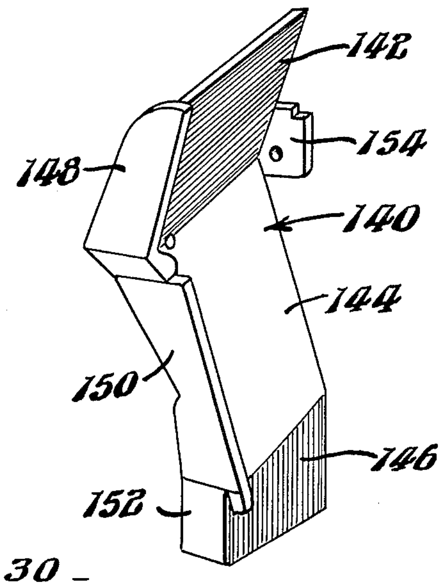
Figure 30:
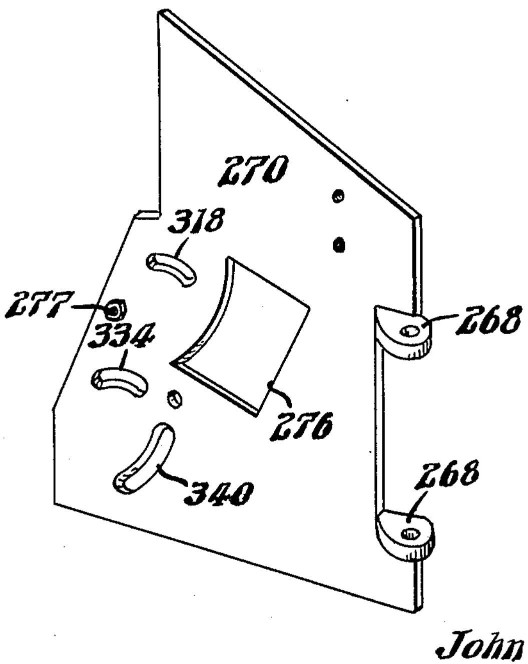
FIG. 30 is a perspective view of a side plate carried by the frame of the control mechanism.
Figure 31:
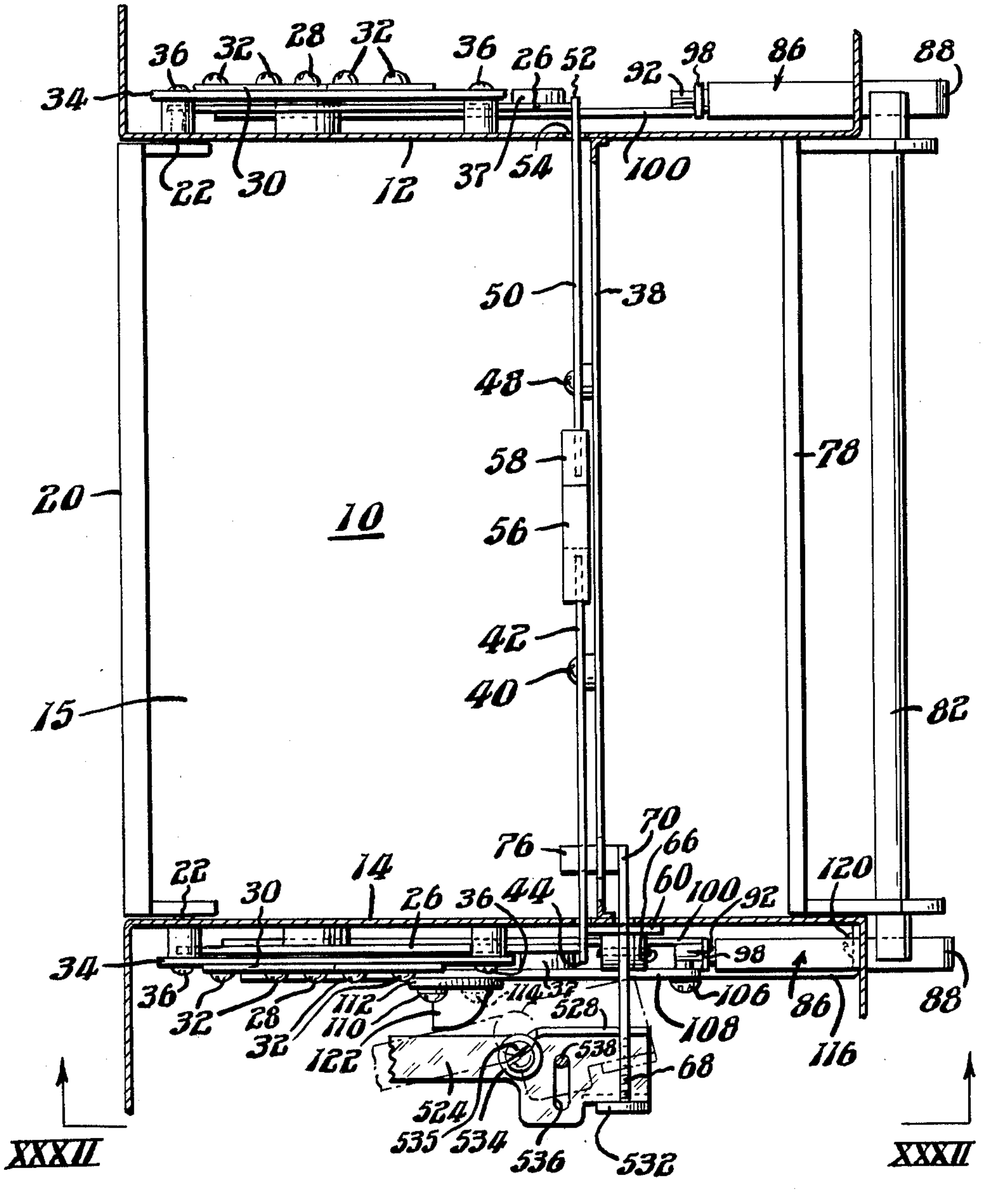
FIG. 31 is a horizontal section through a cabinet showing a closed food compartment.
Figure 33:
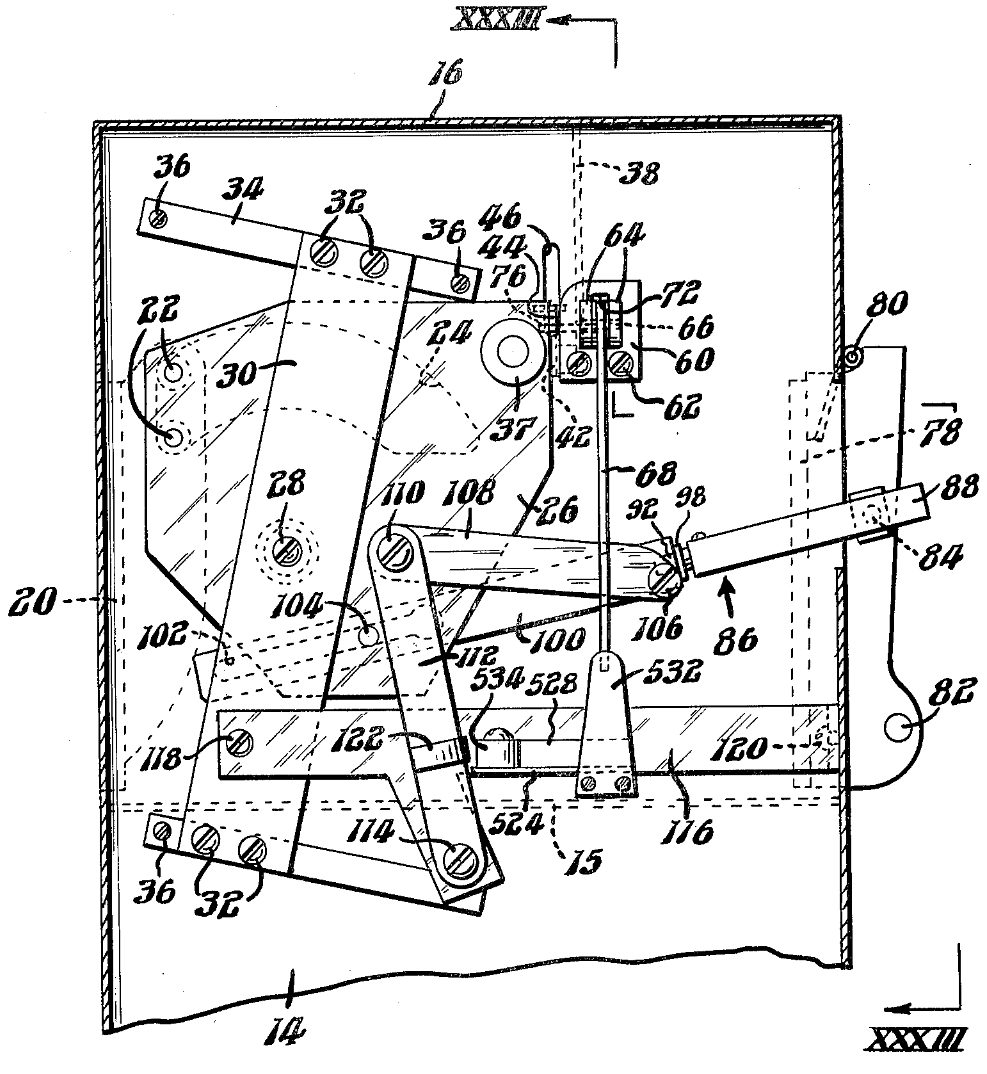
FIG. 33 is a rear elevation of the cabinet, partly shown in section, as indicated by line XXXIII—XXXIII of FIG. 32.
Figure 33:
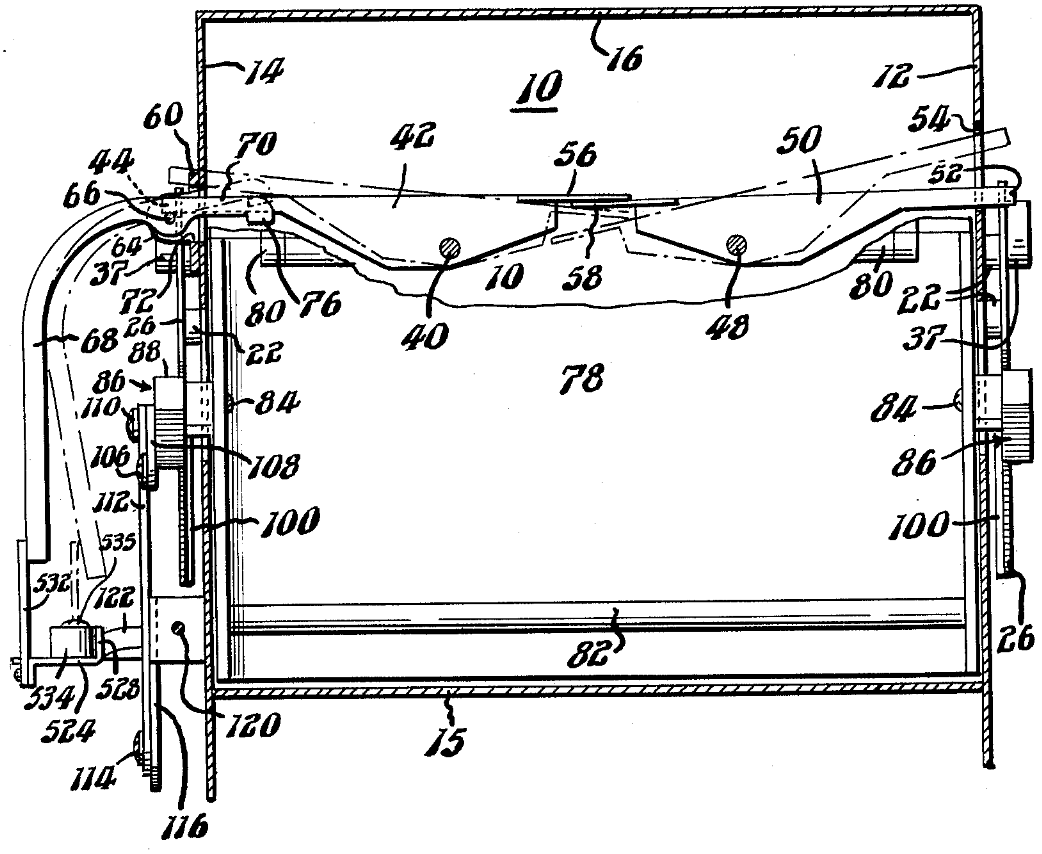
Figure 34:
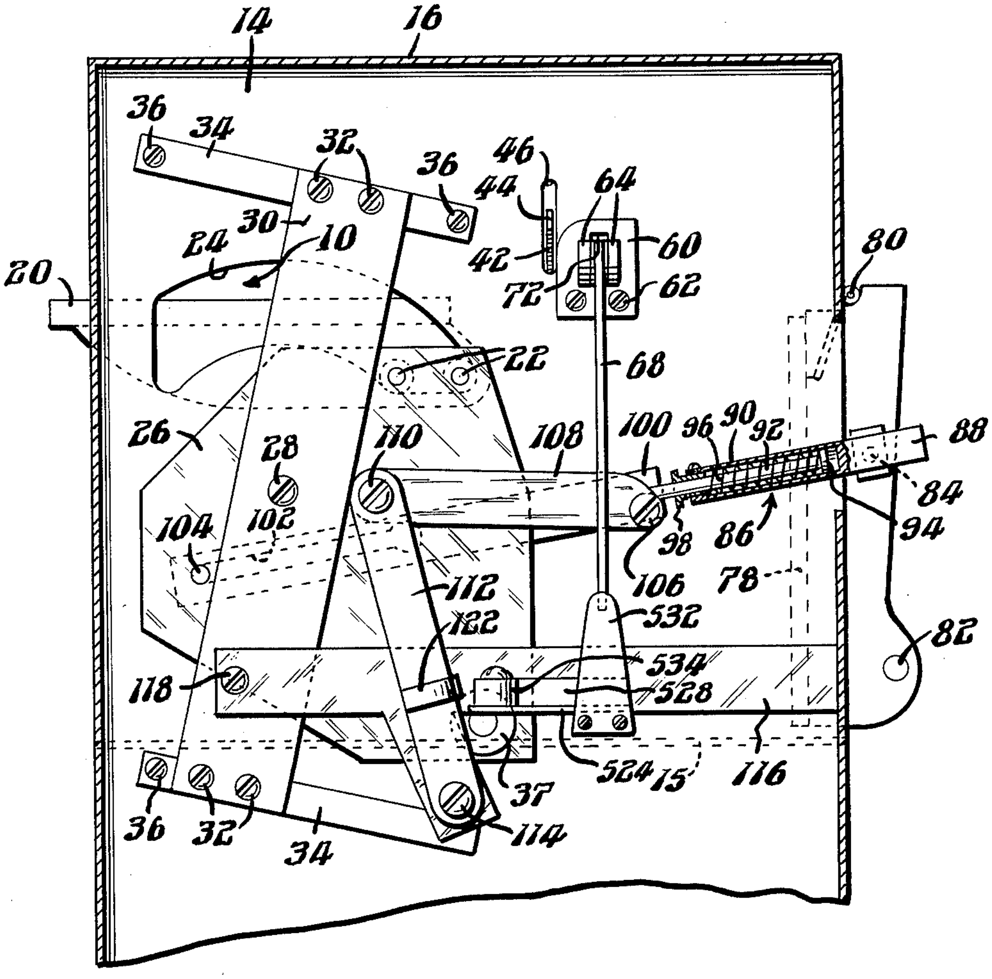
FIG. 34 is similar to FIG. 32 but shows the front of the food cabinet open.
Figure 35:
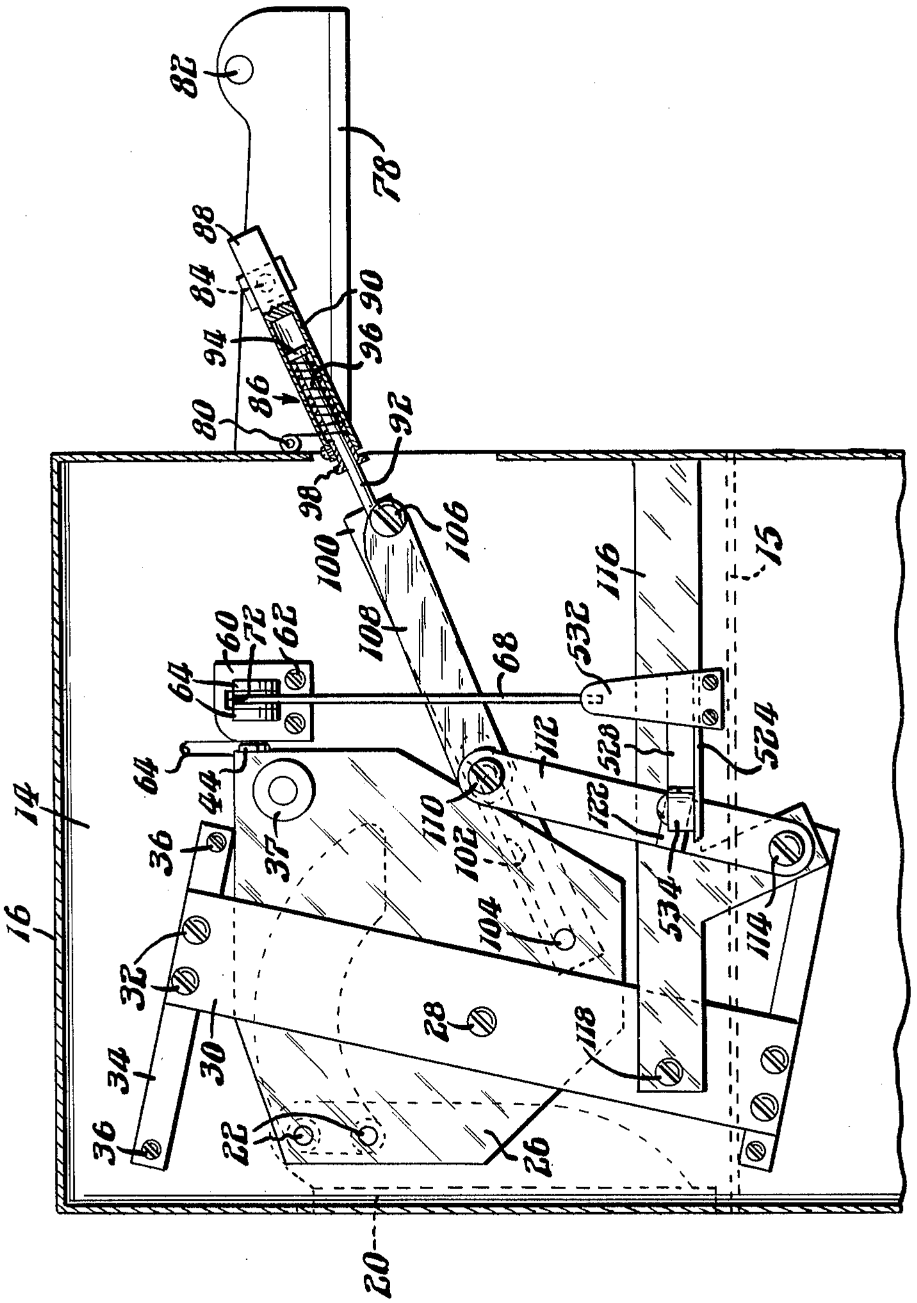
FIG. 35 is similar to FIG. 32 but shows the rear of the cabinet open.

Now referring particularly to FIGS. 28 and 29, the frame of the control mechanism also includes an auxiliary casting, generally designated 140, which includes angularly related main body areas 142, 144 and 146. Extending along the rear edge of the auxiliary casting is a flange having parts 148, 150 and 152 associated respectively with the main body areas 142, 144 and 146. Extending along the front edge of the auxiliary casting is an ear 154.

Figure 4:
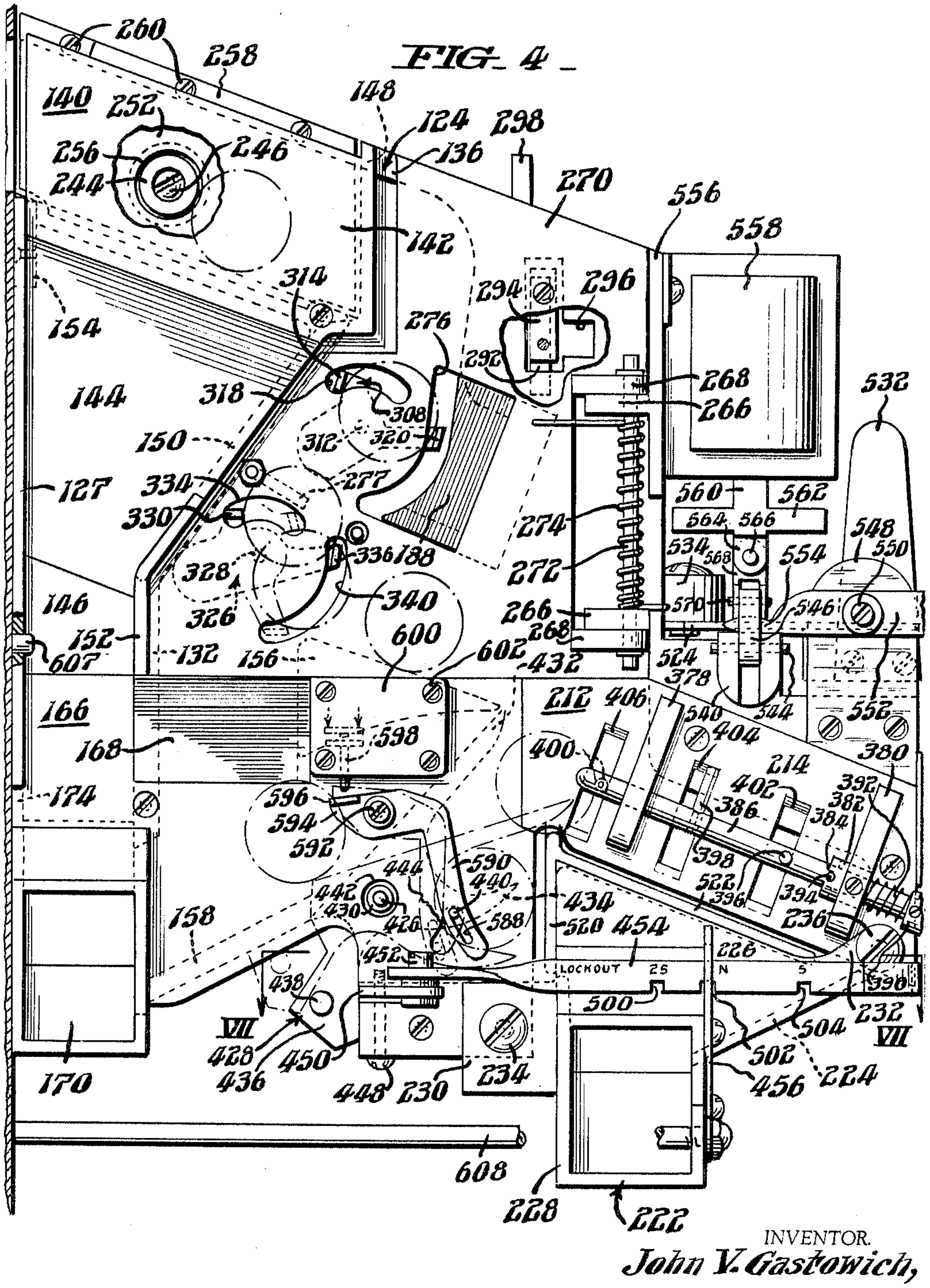
FIG. 4 is a side elevation of the control mechanism, as indicated by line IV—IV in FIG. 2.

Referring particularly to FIG. 4, the auxiliary casting 140 is affixed by any suitable means over surface area 126. The flange part 150 extends along rib part 130. The ear 154 is seated against the flange 127. Thus a hollow frame section is formed with an opening 155 at the top between rib part 128 and area 142, and an opening 157 at the bottom between areas 126 and 146. Area 142 extends above the rib part 128, and flange part 148 is seated against rib parts 128 and 136, thus forming an opening 159 between area 134 and flange part 148.

Referring again to FIG. 23, the main casting 124 is also provided with a raised area 156 to the rear of the rib part 132. Along the bottom of the casting, the area 134 is bounded by a raised rib 158 and a raised rib having a part 160 and a part 162 forming therebetween a shoulder 164.

Figures 24, 25, 26, 27:
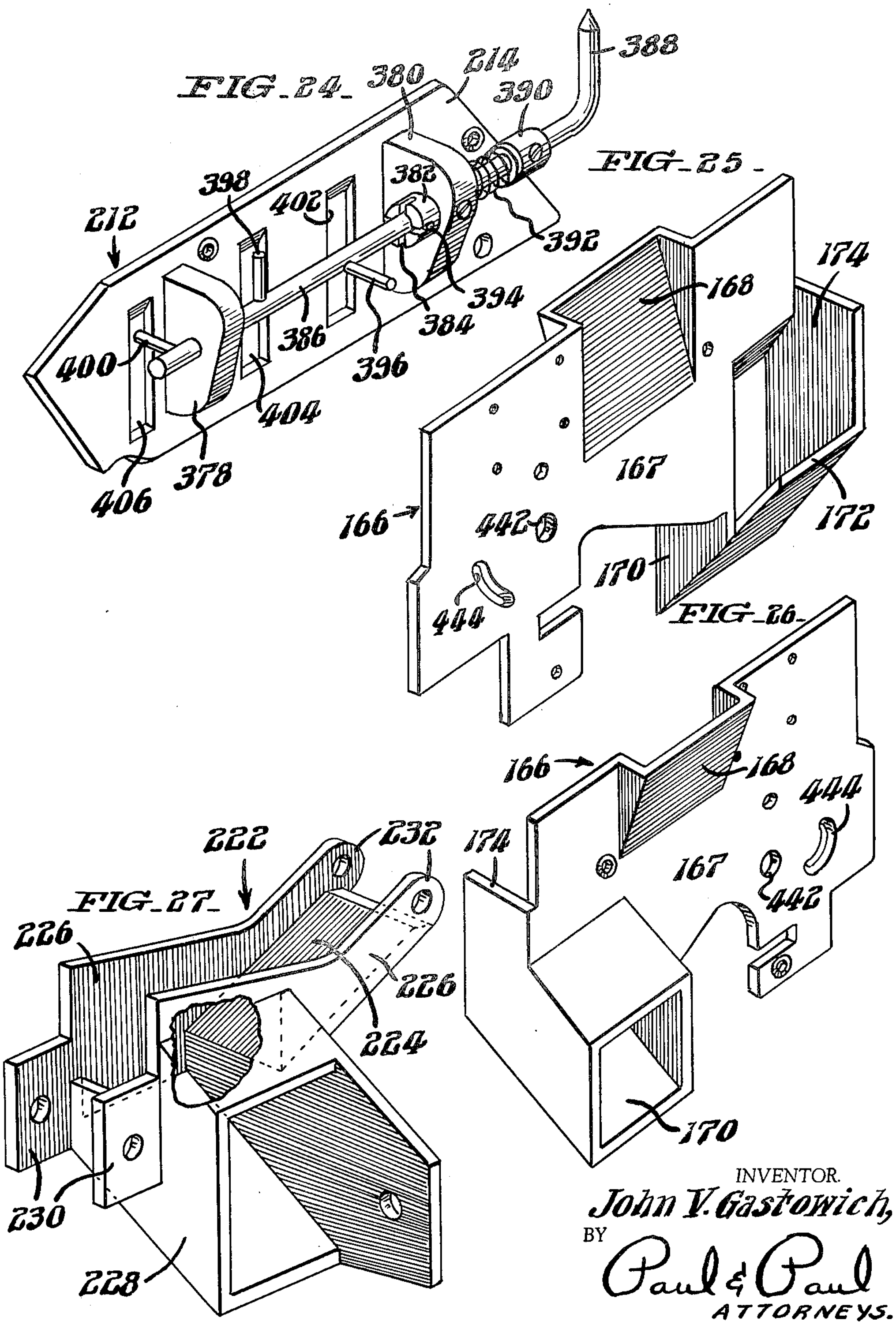

Now referring particularly to FIGS. 25 and 26, the frame of the control mechanism also includes an auxiliary casting, generally designated 166, having a main body area 167, a part 168 of which is laterally offset. At its fore end the casting has a lateral extension in the form of an inclined tubular part or chute 170. At the upper end of the chute 170 the bottom wall is extended, as at 172, and one of the side walls is extended, as at 174.

Referring particularly to FIG. 4, the auxiliary casting 166 is affixed by any suitable means over the lower part of area 126 and the lower fore part of area 134. The main body 167 is seated against rib parts 132 and 160, raised area 156 and rib 158. Thus a hollow frame section is formed with an opening 175 communicating with opening 157, and an opening 177 directly over and communicating with the chute 170. In addition, the hollow section has an opening 176 at its top between rib part 132 and raised area 156, an opening 178 at its rear between raised area 156 and rib part 162, an opening 180 at its bottom between rib part 160 and rib 158, and an opening 182 between rib 158 and the lower end portion of rib part 132. Opening 182 places opening 176 in communication with chute 170, and openings 178 and 180 in communication with chute 170 through a passage 184 between raised area 156 and rib 158.

Figure 20:
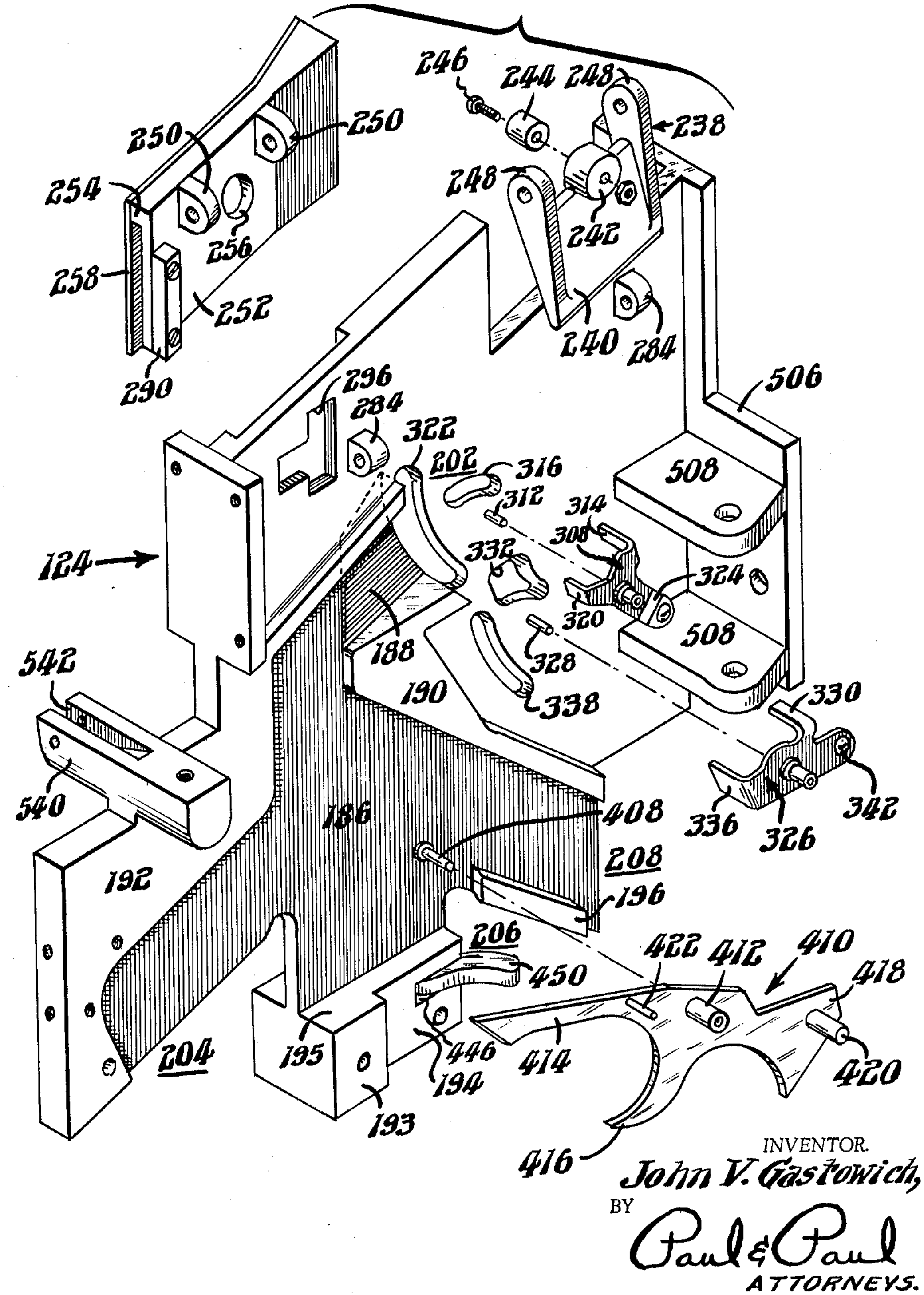
FIG. 20 is an exploded perspective view of the main casting of the frame of the control mechanism and of some related parts.

Referring particularly to FIG. 20, the main casting 124 is provided on the opposite side thereof with an area 186, a part 188 of which is laterally offset. The area 186 is bounded by a raised area 190, a raised area 192, a raised rib having a part 194 and a part forming therebetween a shoulder 195, and a raised rib 196.

Figures 21, 22:
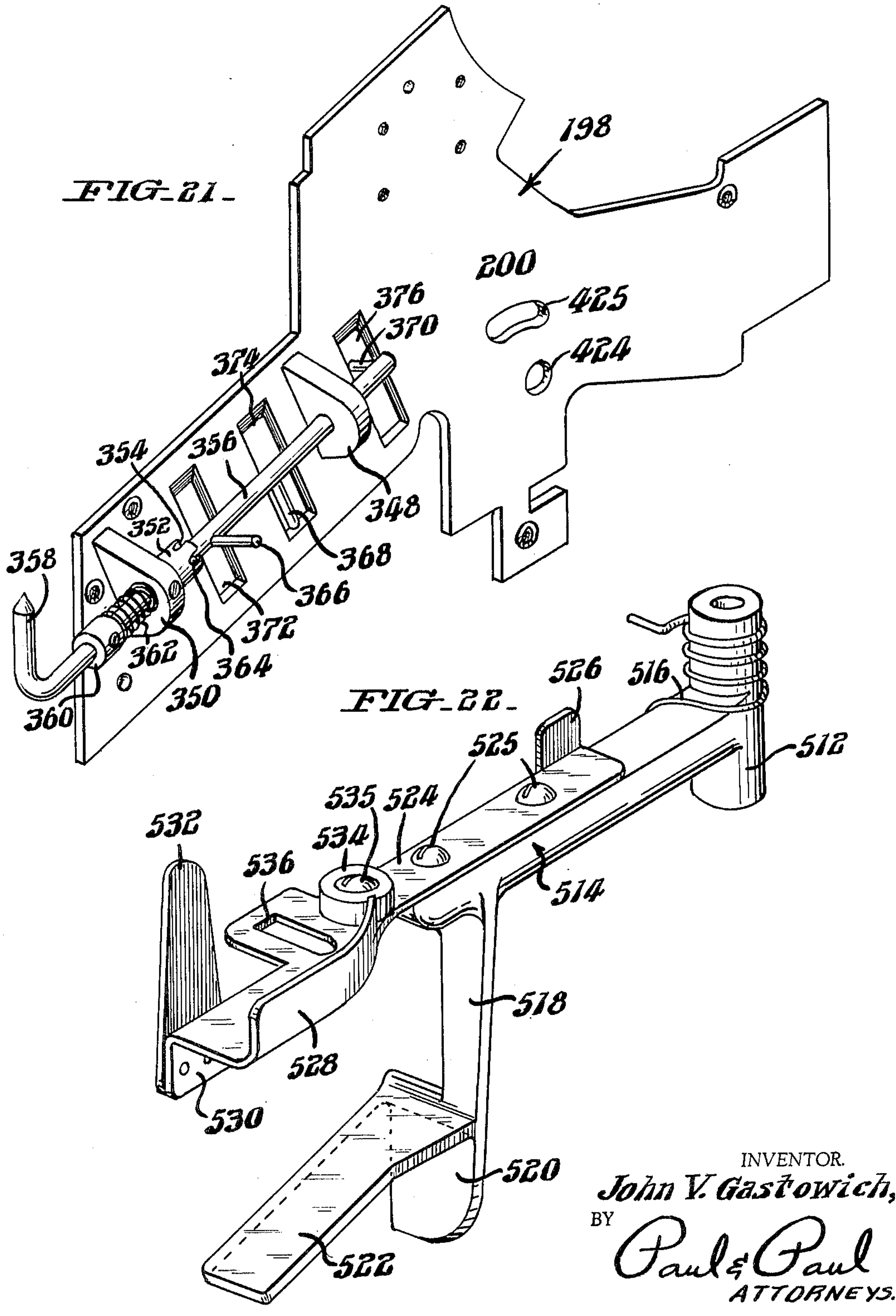
FIGS. 21 and 24 through 29 are perspective views of some auxiliary castings of the frame.
FIG. 22 is a perspective view of the operating arm of the control mechanism.

Now referring particularly to FIG. 21, the frame of the control mechanism also includes an auxiliary casting, generally designated 198, having a main body area 200.

Figure 3:
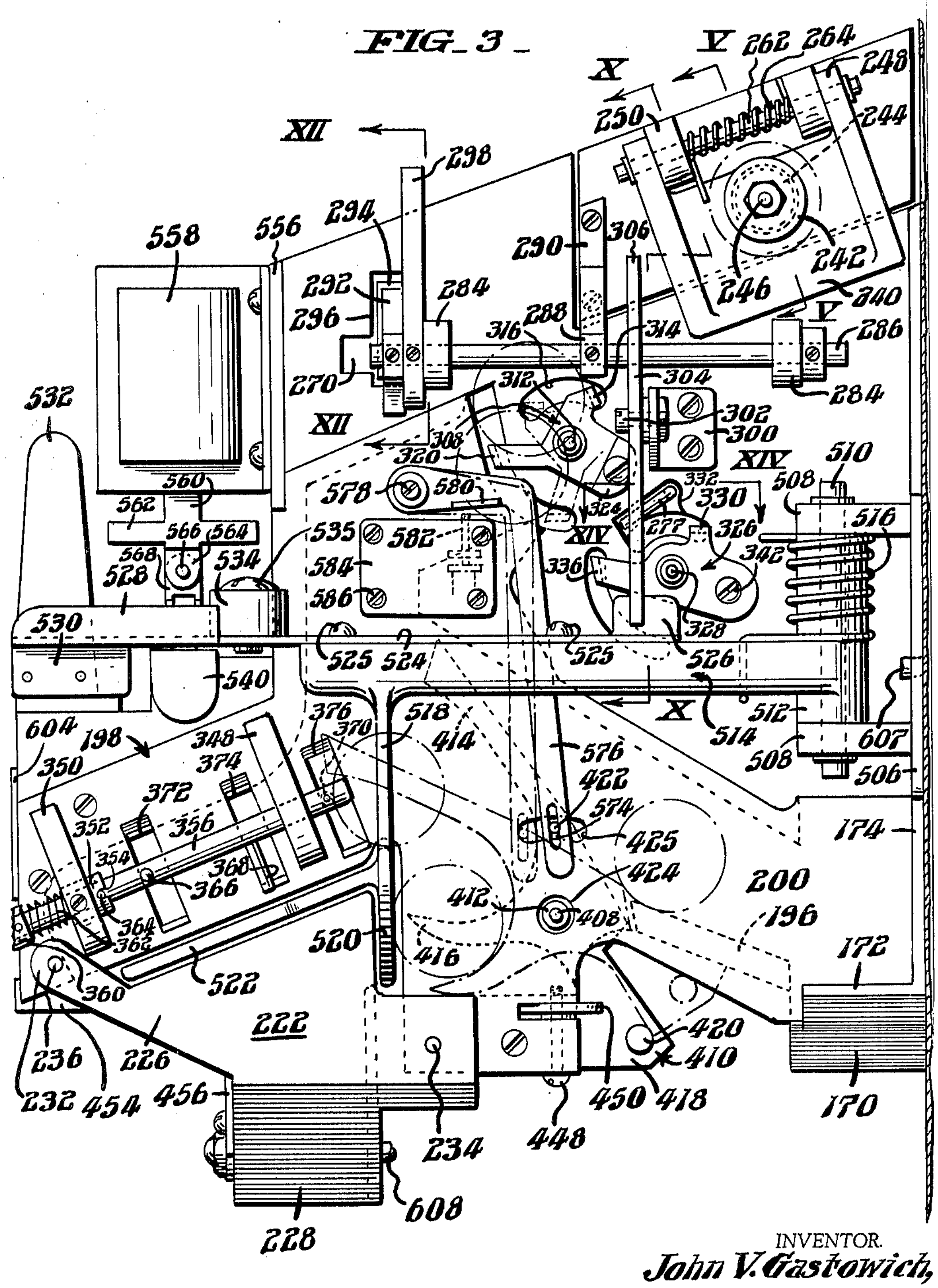
FIG. 3 is a side elevation of the control mechanism, as indicated by line III—III in FIG. 1.

Referring particularly to FIG. 3, the auxiliary casting 198 is affixed by any suitable means over surface area 186. The marginal areas thereof are seated against raised areas 190 and 192, rib part 194 and rib 196. Thus a hollow section is formed with an opening 202 at the top between areas 188 and 200, an opening 204 at the bottom to the rear of rib part 193, an opening 206 at the bottom in front of rib part 194, and an opening 208 in the front between area 190 and rib 196 communicating with chute 170. The area 200 extends forwardly beyond area 186 and is received between the extensions 172 and 174 to close the upper end of the chute 170.

Referring again particularly to FIG. 23, the main casting 124 is also provided at the rear thereof with a raised area 210.

Now referring particularly to FIG. 24, the frame of the control mechanism also includes an auxiliary casting, generally designated 212, having a main body area 214.

Referring particularly to FIG. 4, the auxiliary casting 212 is affixed by any suitable means over the rear part of area 134. The main body area 214 is seated against raised area 210, and the fore end of area 214 extends forwardly to the auxiliary casting 166. Thus a hollow section is formed with an opening 216 at its fore end communicating with opening 178, and opening 218 at its top between areas 156 and 210 and an opening 220 at its bottom, to the rear of rib part 162.

Referring particularly to FIG. 27, the frame of the control mechanism also includes an auxiliary casting, generally designated 222, provided with a chute section having an inclined bottom wall 224, and opposite side walls 226, and provided with an inclined tubular part or chute section 228. At the upper extremity of the walls 226 are ears 232, and at the lower extremity of the walls 226 are ears 30. Ears 230 embrace the rib parts 162 and 192, being secured by screws 234. The ears 232 embrace the lower rear corner areas of castings 124, 198 and 212 and are secured by screws 236. The opening 220 is directly over the open chute section 224, 228 of casting 222.

Referring particularly to FIGS. 3, 20 and 23, formed integral with the main casting 124 is a bracket 238 having a main body area 240. Formed integral with the mean body area is a socketed boss 242 in which nested a permanent magnet 244 secured by a screw 246. At opposite ends of the bracket respectively are a pair of ears 248 disposed in side abutting relation respectively to a pair of ears 250 formed on a casting 252 having a flange 254 extending along the upper edge thereof. Depending from the flange 254 is a plate 258 secured by screws 260. Extending through the ears 248 and 250 is a pin 262 embraced by a spring 264. The opening between casting 252 and plate 258 is directly over rib part 128. Thus a main passage for coins is formed, which passage communicates with opening 159. The magnet 244 projects freely through an opening 256 formed in the casting 252, but not into the coin passage.

Referring particularly to FIGS. 4, 14, 15, 23 and 30, the main casting 124 is provided with a pair of vertically spaced ears 266 disposed in side abutting relation respectively to a pair of ears 268 provided on a plate 270. Extending through the ears 266 and 268 is a pin 272 embraced by a spring 274. The plate 270 is provided with an opening 276 which accommodates the area 188 of the main casting and mounts a hook 277 for a purpose to appear.

The plate 270 overlies the upper part of the area 134 and is seated against the rib parts 130, 136, 138, and raised area 156. Thus a hollow section is formed with an opening 278 at its upper fore corner registering with opening 159, an opening 280 at its lower fore corner registering with opening 176, passage 282 between area 188 and raised area 156 communicating with opening 218.

Referring particularly to FIGS. 3 and 10 through 13, the main casting 124 is provided with a pair of laterally spaced ears 284 through which extends a shaft 286 mounting a finger 288 which engages a bar 290 affixed to the casting 252. The shaft also mounts a finger 292 which extends through an opening 296 formed in the main casting and engages a bar 294 affixed to the plate 270. Also mounted upon the shaft is a manual lever 298 which may be used to swing the fingers 288 and 292 about the axis of the shaft 286, thereby swinging member 252 and plate 258 about the axis of pin 262 against the influence of spring 264 and plate 270 about the axis of pin 272 against the influence of spring 274.

Affixed to the main casting 124 is a bracket 300 mounting a pin 302 upon which is pivoted a lever 304. The upper end of the lever 304 is curved, as at 306. The lever may be pivoted about the pin 302 for swinging member 252 and plate 258 about the axis of the pin 262 against the influence of the spring 264.

Referring particularly to FIGS. 3, 4, 14, 15, 20 and 30, a coin sorter, generally designated 308, is pivoted at 312 to the main casting 124 and is provided with a finger 314 extending through an arcuate opening 316 in the main casting and through a registering arcuate opening 318 in plate 270. The sorter is also provided with a second finger 320 extending through an arcuate opening 322 in the main casting and through the opening 276 in the plate 270. The sorter is weighted, as at 324. The main casting also mounts a slug arrester, generally designated 326, pivoted at 328 and having a finger 330 extending through an opening 332 in the main casting and through a registering arcuate opening 334 in plate 270. The slug arrester 326 is also provided with a second finger 336 extending through an arcuate opening 338 in the main casting and through a registering opening 340 in the plate 270. The arrester is weighted, as at 342. The hook 277 carried by the plate 270 is accommodated by the opening 332.

Figures 16, 17, 18, 19, 36:
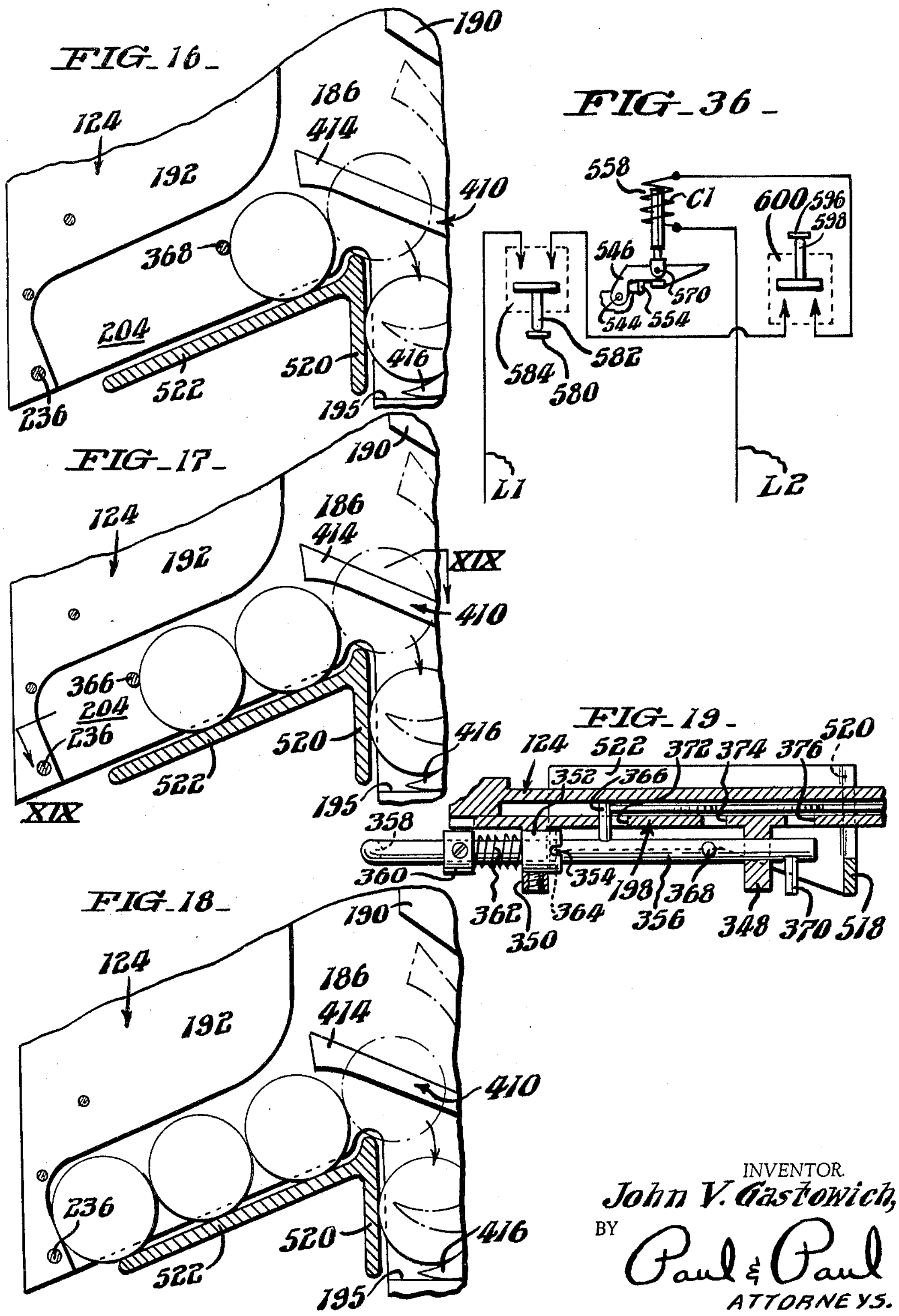
FIG. 16 is a fragmentary vertical section showing the control mechanism loaded with two quarters.
FIG. 17 is similar to FIG. 16 but shows the control mechanism loaded with three quarters.
FIG. 18 is similar to FIG. 16 but shows the control mechanism loaded with four quarters.
FIG. 19 is a fragmentary section on line XIX—XIX in FIG. 17.
FIG. 36 is a wiring diagram.

Referring particularly to FIGS. 3, 19 and 21, the auxiliary casting 198 is provided with a pair of laterally spaced ears 348 and 350. Extending from the ear 350 toward the ear 348 is a tubular sleeve 352 the free end portion of which is provided with circumferentially spaced notches 354. Extending through the ears 348 and 350 is a shaft 356 provided with a handle 358. Between the handle 358 and the ear 350 is a collar 360 affixed to the shaft 356, and between the collar and the ear 350 is a spring 362. Affixed to the shaft is a pin 364 nested in one of the notches 354. Affixed to longitudinally spaced portions of the shaft are a set of pins 366, 368 and 370 disposed at ninety degrees relative to each other about the axis of the shaft. The pin 370 extends through an opening 376 formed in the auxiliary casting. Similar openings 372 and 374 are provided respectively for accommodating pins 366 and 368.

Referring particularly to FIGS. 4 and 24, the auxiliary casting 212 is provided with a pair of laterally spaced ears 378 and 380. Extending from the ear 380 toward the ear 378 is a tubular sleeve 382 the free end of which is provided with a series of circumferentially spaced notches 384. Extending through the ears 378 and 380 is a shaft 386 provided with a handle 388. Between the handle 388 and the ear 380 is a collar 390 affixed to the shaft 386, and between the collar and the ear 380 is a spring 392. Affixed to the shaft is a pin 394 nested in one of the notches 384. Affixed to longitudinally spaced portions of the shaft are a set of pins 396, 398 and 400 disposed at ninety degrees to each other about the axis of the shaft. The pin 400 extends through an opening 406 formed in the auxiliary casting. Similar openings 402 and 404 are provided respectively for accommodating pins 396 and 398.

Referring particularly to FIGS. 3, 20 and 21, the main casting 124 mounts a pin 408 which carries a lever, generally designated 410, having a hub 412 fitted over the pin 408. The lever 410 is provided with a straight arm 414, a laterally extending hooked arm 416 and a tail 418. The tail is weighted, as at 420. Affixed to the lever 410 is a pin 422. The casting 198 is provided with an opening 424 which accommodates the hub 412, and with an arcuate opening 425 which accommodates the pin 422.

Referring particularly to FIGS. 4, 23 and 26, the main casting 124 also mounts a pin 426 which carries a lever, generally designated 428, having a hub 430 fitted over the pin 426. The lever 428 is provided with a straight arm 432, a laterally extending hooked arm 434, and a tail 436. The tail of the lever is weighted, as at 438. Affixed to the lever 428 is a pin 440. The auxiliary casting 166 is provided with an opening 442 which accommodates the hub 430, and with an arcuate opening 444 which accommodates the pin 440.

Referring particularly to FIGS. 3, 4, 7 to 9, 20 and 23, formed in the bottom of the frame is a rearwardly extending recess 446, across which extends an upright pivot 448 mounting a lever 450. One end of the lever mounts a pivot 452 to which is connected a rearwardly extending bar 454. The bar 454 extends freely through an opening 458 in a plate 456. Longitudinally spaced portions of the bar 454 are notched, as at 500, 502 and 504.

Referring particularly to FIGS. 3, 16 through 18, 20 and 22, the main casting 124 is provided with a flange 506 upon which are formed a pair of vertically spaced ears 508. Extending through the ears 508 is a pin 510, which also passes through the hub 512 of an operating arm, generally designated 514. Wrapped around the hub 512 is a spring 516. Depending from the rear end of the arm 514 is an extension widening at the lower terminal thereof into a coin discharge gate including an upright portion 520 and a rearwardly and downwardly extending portion 522. The coin discharge gate extends across the walls 226 and across the openings 204 and 220. Mounted upon the arm 514 is a plate 524 secured by screws 525. The plate is provided at the fore end with an upstanding tab 526 and at the rear end with an upstanding flange 528 and a depending flange 530. Affixed to the flange 530 is an upstanding trip llate 532 for a purpose to appear. The plate 524 carries a cam follower 534 secured by a screw 535.

Referring particularly to FIGS. 2 to 4, 20 and 22, the plate 524 is provided with a slot 536 which receives a pin 538 upstanding from a crosspiece 540 formed integral with the main casting 124. The crosspiece 540 is provided with a longitudinally extending slot 542 across which extends a pin 544. One end of a latch 546 is pivoted on the pin 544. Affixed to the main casting 124 is a plate 548 which carries a pin 550 on which is pivoted a manual release lever 552. One end of the lever, designated 554, underlies the latch 546.

Referring particularly to FIGS. 2, 3 and 4, at the rear end of the main casting 124 is a flange 556 to which is attached a solenoid 558. Depending from the solenoid is a plunger 560 provided with a head 562 and laterally spaced ears 564. Extending through the ears 564 is a pin 566 to which is attached a link 568. Extending through the lower terminal portion of the link 568 is a pin 570 which is received by an elongated opening 572 formed in the latch 546.

Referring to FIG. 3, the pin 422 extends through an elongated opening 574 formed in a lever 576. The lever is pivoted at 578 and is provided with a laterally extending tab 580, which tab overlies the plunger 582 of a micro-switch 584, the micro-switch being secured by screws 586.

Referring particularly to FIG. 4, the pin 440 is received by an elongated opening 588 formed in a lever 590 which is pivoted at 592. The tail 594 of the lever is provided with a laterally extending tab 596 which underlies the plunger 598 of a micro-switch 600 secured by means of screws 602.

Referring particularly to FIG. 36, the wires L1 and L2 are the feed and return of an electric line in which the micro-switch 585 and the micro-switch 600 are connected in series with the coil C1 of the solenoid 558.

Referring particularly to FIG. 2, mounted upon the rear end of the main casting 124 is a plate 604 secured by screws 606. The plate bears indicia for guidance in positioning the handles 358 and 388 of the shafts 356 and 386.

It will be understood that the control mechanism is stationarily mounted on studs 607 mounted on the front of the cabinet, and secured by tie bolt 608.

Figure 7:
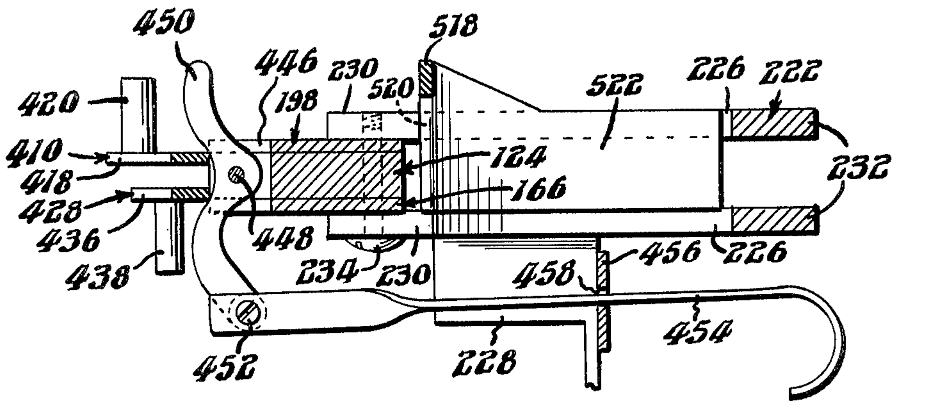
FIG. 7 is a section on line VII—VII in FIG. 4 showing the control mechanism in neutral position, i.e., set for accepting both quarters and nickels.
Figure 8:
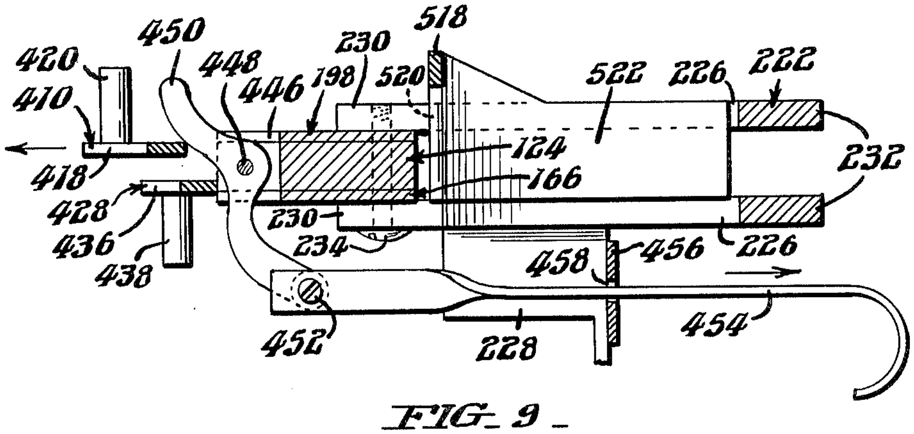
FIG. 8 is similar to FIG. 7 but shows the control mechanism set for accepting nickels only.
Figure 9:
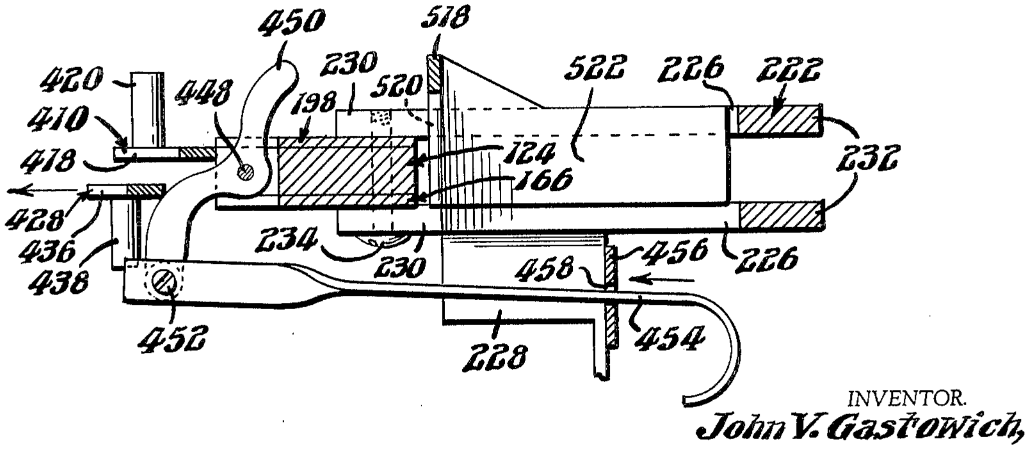
FIG. 9 is similar to FIG. 7 but shows the control mechanism set for accepting quarters only.

Assuming that the control mechanism is to operate upon insertion of one quarter and one nickel, operation thereof is as follows: The bar 454 is manually set in neutral position, as shown in FIGS. 4 and 7, in consequence of which both micro-switches 584 and 600 are open. The shaft handles 358 and 388 are turned upwardly, i.e., set in position No. 1, indicates on plate 604, in consequence of which pin 370 extends through opening 376 to the surface 186 of the main casting 124, and pin 400 extends through opening 406 to the surface 134 of the main casting 124. A quarter may be inserted at the upper fore corner of the control mechanism, between casting 252 and plate 258. The coin rolls downwardly and rearwardly over rib part 128, i.e., through the main coin passage, through openings 159 and 278, and drops onto fingers 314 and 320, whereupon the weight of the coin overcomes the influence of the weight 324 and the sorter 308 turns about pivot 312 directing the coin into the opening 202, which is the entrance to an auxiliary passage. The coin drops between the raised areas 190 and 192 and past the raised arm 414 of the lever 410. Then it is deflected by the pin 370, whereupon it lodges in the hooked arm 416 of the lever 410. The weight of the coin overcomes the influence of the weight 420, and lever 410 turns about pin 408. The coin finally comes to rest against the portion 520 of the coin discharge gate, as shown in dot and dash lines in FIG. 3. When the lever 410 and pin 422 move counterclockwise, as viewed in FIG. 3, the pin turns lever 576 clockwise about pivot 578. Thereupon tab 580 depresses the plunger 582, closing the microswitch 584.

When a nickel is inserted, the coin rolls downwardly and rearwardly over rib part 128, through openings 159 and 278 and then drops, passing freely between fingers 314 and 320 of sorter 308 and into another auxiliary passage. The coin lodges on fingers 330 and 336 of arrester 326. The weight of the coin overcomes the influence of weight 342 and the arrester 326 turns about the pivot 328, directing the coin via passage 282 to opening 218. The coin drops onto pin 400 and is deflected so that it finally lodges in the hooked arm 434 of the lever 428. The weight of the coin overcomes the influence of weight 438, and lever 428 turns about the pin 426. The coin finally comes to rest against the portion 520 of the coin discharge gate, as shown in dot and dash lines in FIG. 4. When the lever 428 and pin 440 turn clockwise (as viewed in FIG. 4), the pin turns lever 590 clockwise about pivot 592. Thereupon tab 596 depresses plunger 598, closing micro-switch 600. Thus the electric circuit is closed and solenoid C1 is energized, as a consequence of which, the plunger 560 is retracted, latch 546 raised and arm 514 released. The arm 514 swings outwardly to its operated position under the influence of spring 516 (see FIGS. 31 and 33). Thus the coin discharge gate 520, 522 is removed and the coins drop into the chute 228, which directs them into a cash box (not shown).

If a nickel is inserted first instead of a quarter, operation of the control mechanism is as described hereinabove except that when the nickel is inserted, the micro-switch 600 operates and thereafter when the quarter is inserted, the micro-switch 584 operates, closing the circuit and releasing the arm 514.

Now assuming that the control mechanism is to operate upon insertion of two quarters and two nickels, operation thereof is as follows: The bar 454 is manually set in neutral position, and the shaft handles 358 and 388 are turned to the right, i.e., set in position No. 2, indicated on plate 604, in consequence of which, pin 368 extends through opening 374 to the surface 186 of the main casting 124, and pin 398 exends through opening 404 to the surface 134 of the main casting 124. The first quarter inserted follows the same path as described hereinbefore, except that after dropping past raised arm 414 of the lever 410, it rolls down part 522 of the coin discharge gate and is arrested by pin 368. The second quarter inserted follows the same path as described hereinbefore, except that after dropping past raised arm 414 of lever 410, it is deflected by the first quarter and directed thereby into the hooked arm 416 of the lever 410. The first nickel inserted follows the same path as described hereinbefore, except that after dropping through opening 218, it rolls down part 522 of the coin discharge gate and is arrested by pin 398. When the second nickel is inserted, it follows the same path as described hereinbefore, except that after dropping past raised arm 432 of lever 428, it is deflected by the first nickel and directed thereby into the hooked arm 434 of the lever 428.

The coins may be inserted in any desired order. When the second coin of either denomination is inserted, the associated micro-switch closes. When the last coin is inserted, the other micro-switch closes, closing the electric circuit and unlatching the arm 514, with the result that all the coins are discharged into the chute 228.

Now assuming that the control mechanism is to operate upon insertion of three quarters and three nickels, operation thereof is as follows: The bar 454 is manually set in neutral position, and the shaft handles 358 and 388 are turned downwardly, i.e., set in position No. 3, indicated on plate 604, in consequence of which, pin 366 extends through opening 372 to the surface 186 of main casting 124 (see FIG. 19), and pin 396 extends through opening 402 to the surface 134 of the main casting 124. Otherwise, operation is the same as when the control mechanism is to operate upon insertion of two quarters and two nickels.

Now assuming that the control mechanism is to operate upon insertion of four quarters and four nickels, operation thereof is as follows: The bar 454 is manually set in neutral position, and the shaft handles 358 and 388 are turned to the left, i.e., set in position No. 4, indicated on plate 604. Otherwise, operation is the same as when the control mechanism is to operate upon insertion of two quarters and two nickels or three quarters and three nickels, except that the first quarter is arrested by the rearmost portion of the raised area 192, and the first nickel is arrested by the rearmost portion of the raised area 210.

The control mechanism may be set to operate upon insertion of an optional number of quarters and an optional number of nickels, e.g., one quarter and two nickels or three quarters and two nickels. If desired, it may be set to accept quarters only or nickels only.

Assuming that the control mechanism is to operate upon insertion of one quarter, the shaft handle 358 is turned upwardly, i.e., placed in position No. 1. The shaft handle 388 may be placed in any position. Bar 454 is set with notch 504 engaging plate 456 (see FIG. 9). This closes the micro-switch 600. The nickels follow the same path as described hereinbefore, except that after dropping through opening 218, they roll through a passage branching off from the auxiliary passage, i.e., forwardly over lowered arm 432 of lever 428 and forwardly over rib 158 and through opening 182 into coin chute 170 for return to the customer. Upon insertion of a quarter, the micro-switch 584 closes, in consequence of which the electric circuit is made and the control mechanism operates as described hereinbefore.

Assuming that the control mechanism is to operate upon insertion of one nickel, the shaft handle 388 is turned upwardly, i.e., placed in position No. 1. The shaft handle 358 may be placed in any position. Bar 454 is set with notch 500 engaging plate 456 (see FIG. 8). This closes the micro-switch 584. Quarters follow the same path as described hereinbefore, except that after dropping from between raised areas 190 and 192 they roll through a passage branching off from the auxiliary passage, i.e., forwardly over lowered arm 414 and over rib 196 and through opening 208 into coin chute 170 for return to the customer. Upon insertion of a nickel, the micro-switch 584 closes, in consequence of which the electric circuit is made and the control mechanism operates as described hereinbefore.

When the last required coin of either denomination is inserted, the mechanism refuses any additional coins of that denomination that may be inserted. For example, assume that the control mechanism is set to operate upon insertion of one quarter and one nickel, and that a quarter has been inserted, lowering the arm 414 of the lever 410. Now if a second quarter is inserted, it follows the same path as described hereinbefore, but since the arm 414 is in lowered position, the coin rolls down over arm 414 and rib 196 and through opening 208 into coin chute 170, being thereby returned to the customer. On the other hand, if the first inserted coin is a nickel, the arm 432 is in lowered position when the second nickel is inserted, in consequence of which the second nickel rolls down over arm 432 and rib 158 and through opening 182 into coin chute 170, being thereby returned to the customer.

Referring particularly to FIGS. 31 through 35, when the arm 514 is operated, the trip plate 532 actuates the trip lever 68, in consequence of which the customer's door 20 is unlatched. Thereupon the door opens automatically, as described hereinbefore. When the attendant opens his door 78, the cam 122 engages the follower 534, in consequence of which the arm 514 is reset, against the influence of spring 516.

When arm 514 swings outwardly, the tab 526 actuates lever 304, and the curved end 306 of the latter actuates the casting 252 and plate 258, turning the same about the axis of pin 262. If a coin is now inserted, it drops from between casting 252 and plate 258, through openings 155, 157, 175 and 177, i.e., through a coin return passage into the chute 170 for return to the customer. Member 252 and plate 258 return to their initial positions when the arm 514 is reset.

If a slug of magnetic material is inserted, it is arrested by the magnet 244. Thereupon the attendant actuates the lever 298, as a consequence of which the casting 252 and plate 258 pivot on pin 262, freeing the coin from the magnet, whereupon the coin drops through openings 155, 157, 175 and 177 into coin chute 170 for return to the customer.

If the slug is about the size of but lighter than a nickel and made of non-magnetic material, it is arrested by the fingers 330 and 336. Thereupon the attendant actuates lever 298, in consequence of which the plate 270 swings outwardly about pin 272 against the influence of spring 274. The hook 277 dislodges the slug (see FIGS. 14, 15), which drops through a passage branching off from the auxiliary passage, i.e., through openings 280 and 176 and passes through opening 182 into coin chute 170 for return to the customer.

What is claimed is:

1. The combination comprising a utility releasably secured against operation, and a control mechanism for said utility including a frame mounting a movable section providing a main passage for receiving coins manually inserted thereinto, said frame having internally thereof auxiliary passages and a coin return passage for receiving coins from said main passage, means proximate the juncture of said main and auxiliary passages for automatically sorting coins as they issue from said main passage and directing coins different in size respectively into said auxiliary passages, gate means at the ends of said auxiliary passages blocking discharge of coins therefrom, and means responsive to insertion of proper coins for releasing the associated utility and simultaneously actuating said gate means thereby to remove same from its coin blocking position and actuating said movable section for placing the same in communication with said coin return passage whereby coins inserted into said main passage by-pass said auxiliary passages.

2. The combination defined in claim 1 wherein when the movable frame section is actuated the opposite side walls of the main passage shift laterally relative to the floor of the main passage.

3. The combination defined in claim 2 wherein the frame stationarily mounts a permanent magnet for arresting slugs in the main passage, and wherein the movable frame section is adapted for freeing the slugs from the magnet, whereupon the slugs are gravity discharged into the coin return passage.

4. The combination comprising a utility releasably secured against operation, and a control mechanism for said utility including a frame having internally thereof a main passage for receiving coins manually inserted thereinto and auxiliary passages for receiving coins from said main passage, one of said auxiliary passages being provided with a coin return branch, means proximate the juncture of said main and auxiliary passage for automatically sorting coins as they issue from said main passage and directing coins different in size respectively into said auxiliary passages, gate means at the ends of said auxiliary passages blocking discharge of coins therefrom, means responsive to insertion of proper coins for releasing the associated utility and simultaneously actuating said gate means thereby to remove the same from its coin blocking position, means proximate the juncture of said auxiliary passage and its coin return branch for automatically arresting slugs, and manually operable means for freeing slugs from said arresting means for gravity discharge into said coin return branch.

5. The combination defined in claim 4 wherein the automatic slug arresting means includes a rockable member adapted for receiving coins, and means biasing said member to position the same for receiving coins moving along the auxiliary passage, said member being responsive to the weight of a coin received thereby for rocking against the influence of said bias and thereby passing said coin for continued movement along said auxiliary passage, but being unresponsive to the lighter weight of a slug received thereby.

6. The combination comprising a utility releasably secured against operation, and a control mechanism for said utility including a frame having internally thereof a main passage for receiving coins manually inserted thereinto and auxiliary passages for receiving coins from said main passage, each of said auxiliary passages being provided with a coin return branch, means proximate the juncture of said main and auxiliary passages for automatically sorting coins as they issue from said main passage and directing coins different in size respectively into said auxiliary passages, gate means at the ends of said auxiliary passages blocking discharge of coins therefrom, a solenoid connected in electric circuit with electric switches associated respectively with said auxiliary passages, means operatively connected with said switches and each independently responsive to the weight of a single coin for closing the associated switch and simultaneously diverting coins from said auxiliary passage and directing them into said coin return passage, said solenoid being responsive to closing of said switches and said circuit for releasing the associated utility and simultaneously actuating said gate means thereby to remove the same from its coin blocking position.

7. The combination defined in claim 6 wherein each means responsive to the weight of a single coin for closing the associated switch includes a rockable member with a pair of arms, and means biasing said member to position one of said arms for receiving a coin and the other for closing the associaated coin return branch, said member being responsive to the weight of a single coin received by said one arm for rocking against the influence of said bias whereby to remove the other arm from its position blocking said coin return passage.

8. The combination comprising a utility releasably secured against operation, and a control mechanism for said utility including a frame having internally thereof passages respectively for coins different in size and manually inserted thereinto, a single gate at the discharge ends of said passages blocking discharge of coins from all of said passages, and means responsive to insertion of proper coins for releasing the utility and simultaneously actuating said gate means thereby to remove the same from its coin blocking position.

9. The combination comprising a utility releasably secured against operation, and a control mechanism for said utility including a frame having internally thereof passages respectively for coins different in size and manually inserted thereinto, gate means at the discharge ends of said passages blocking discharge of coins from all of said passages, manually operable means for setting the mechanism for operation upon insertion of coins selective in size and as to the number of coins of each size, and means responsive to insersion of proper coins for releasing the utility and simultaneously actuating said gate means thereby to remove the same from its coin blocking position.

10. The combination defined in claim 9 wherein the manually operable means for setting the mechanism for operation upon insertion of coins selective in size and as to the number of coins of each size is adapted for setting of the mechanism for each coin size independently of the setting of the mechanism for any other coin size.

11. The combination comprising a utility releasably secured against operation, and a control mechanism for said utility including a frame having internally thereof passages respectively for coins different in size and manually inserted thereinto, means associated respectively with said passages for selectively controlling the number of coins of each size required for operation of the mechanism, gate means at the discharge ends of said passages blocking discharge of coins from all of said passages, a solenoid connected in electric circuit with electric switches associated respectively with said passages, means operatively connected with said switches and each independently responsive to insertion of the last coin of a given size thereof for closing the associated switch, said solenoid being responsive to closing of said switches and said circuit for releasing the associated utility and simultaneously actuating said gate means thereby to remove the same from its coin blocking position.

12. The combination defined in claim 11 wherein each means responsive to insertion of the last coin of a given size thereof for closing the associated switch includes a first rockable member having means for receiving said coin, means biasing said first rockable member to position the same for receiving said coin, said first rockable member being responsive to the weight of said coin for rocking against the influence of said bias, and a second rockable member responsive to rocking of said first rockable member for closing said switch.

References Cited by the Examiner

UNITED STATES PATENTS

| | | | |
|---|---|---|---|
| 1,808,937 | 4/1931 | Schultz. | |
| 1,968,500 | 7/1934 | Mills | 194—10 |
| 2,052,685 | 9/1936 | Wilson et al. | 194—65 |
| 2,777,554 | 1/1957 | Steiner | 194—2 |
| 2,777,555 | 1/1957 | Banning | 194—13 |

LOUIS J. DEMBO, *Primary Examiner.*

SAMUEL F. COLEMAN, *Examiner.*